Feb. 6, 1945.    R. D. SWIFT, JR    2,368,898
SPOON HOLDER
Filed April 14, 1943    2 Sheets—Sheet 1
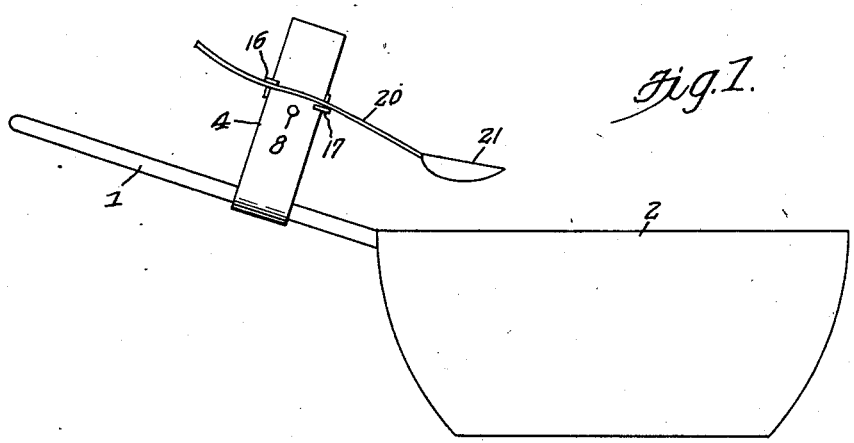
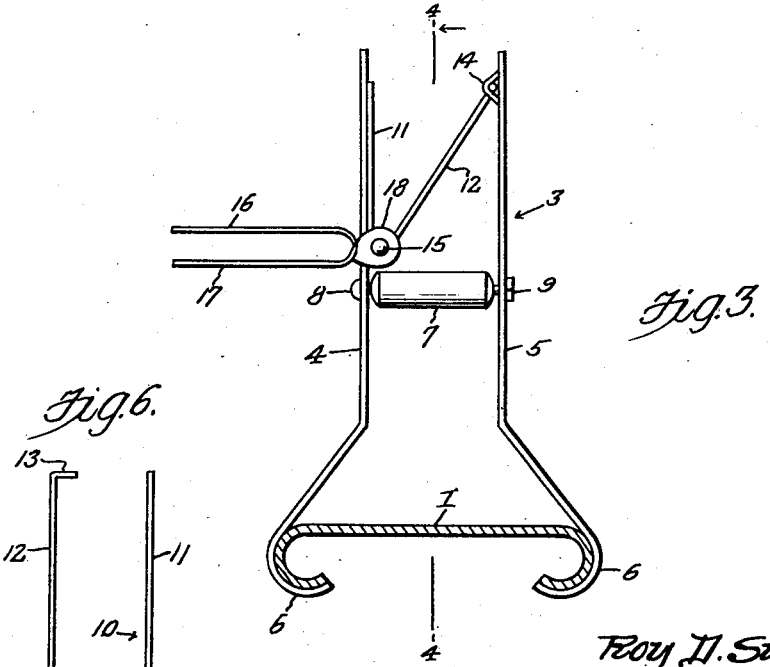
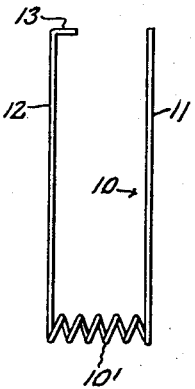
Inventor
Roy D. Swift, Jr.
By Clarence A. O'Brien
and Harvey B. Jacobson
Attorneys Feb. 6, 1945. R. D. SWIFT, JR 2,368,898
SPOON HOLDER
Filed April 14, 1943 2 Sheets-Sheet 2
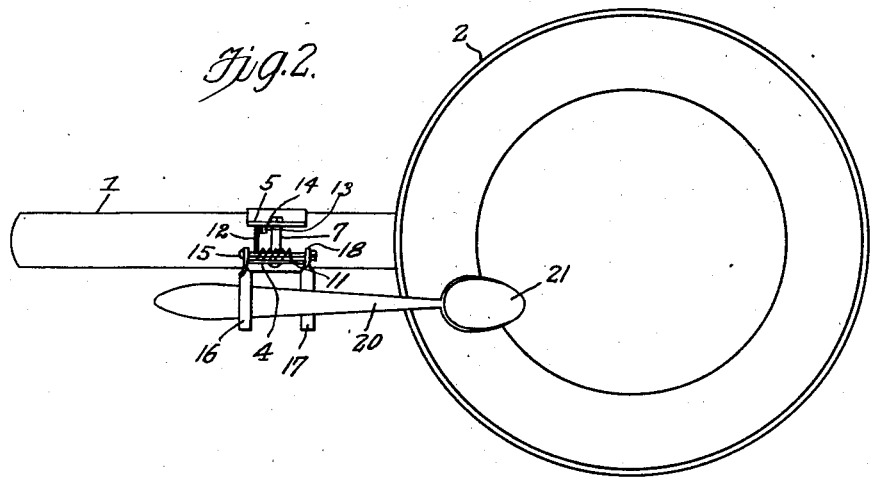
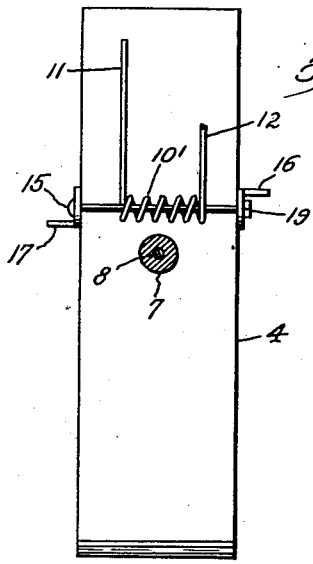
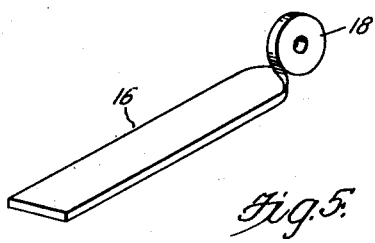
Inventor
Roy D. Swift, Jr.
By Clarence A. O'Brien
and Harvey B. Jacobson
Attorneys Patented Feb. 6, 1945

2,368,898

UNITED STATES PATENT OFFICE 2,368,898

SPOON HOLDER

Roy D. Swift, Jr., Terril, Iowa

Application April 14, 1943, Serial No. 483,015

1 Claim. (Cl. 65—65)

My invention relates to spoon holders for attachment to the handles of cooking pans, the principal object in view being to provide a simply constructed, inexpensive device adapted for easy quick attachment to pan handles of any shape to support a cooking spoon above a pan so as to drip into the same and so that the handle of the spoon is maintained cool, and which provides for the spoon being instantly available for use when desired and for preventing the same from becoming lost, and will not mar the handle of the pan.

To the accomplishment of the above and subordinate objects presently appearing, a preferred embodiment of my invention has been illustrated in the accompanying drawings set forth in detail in the succeeding description, and defined in the claim appended hereto.

In said drawing—

Figure 1 is a view in side elevation illustrating the preferred embodiment of my improved spoon holder applied to the handle of a pan, Figure 2 is a view in plan, Figure 3 is a view in end elevation with the handle shown in section, Figure 4 is a view in vertical section taken on the line 4—4 of Figure 3, Figure 5 is a view in perspective of one of the fingers, and Figure 6 is a view in elevation of the spring.

Referring to the drawings by numerals, my improved spoon holder has been illustrated therein as attached to the usual rolled edge handle 1 of a pan 2 and is designated, as a unit, by the numeral 3.

The holder 3 has the form of a clamp comprising a pair of opposed, flat, metal clamping members 4, 5 terminating in a pair of opposed, relatively divergent, terminally hooked jaws 6 designed to clampingly engage the opposite side edges of the handle 1 of the pan to maintain the members in substantially upright position on said handle.

A transversely extending, roll-like, spacer 7 extending between the members 4, 5 intermediate the ends of the latter and provided with rounded ends, and a bolt 8 extending loosely through said members 4, 5 and axially through the spacer 7, with a nut 9 thereon, provides a swivel connection between the members 4, 5 whereby the jaws 6 are relatively movable toward or from each other into and from clamping relation, respectively, to the handle 1.

On the side of the spacer 7 opposite the jaws 6, spring means is provided between the members 4, 5 for urging the jaws 6 toward clamping relation and which comprises a U-shaped wire spring 10 having a leg 11 bearing flat against the member 4 and a leg 12 inclining to the other member 5 and provided with a terminal hook 13 inserted into a keeper eye 14 pressed out of the member 5. The spring 10 has a coiled bight 10' through which a spring anchoring bolt 15 extends alongside and crosswise of the member 4.

A pair of flat, spoon supporting fingers 16, 17 are clamped against the opposite side edges of the member 4 above the spacer 7 to extend flatwise, outwardly, laterally from said member, and by means of the bolt 15. The fingers 16, 17 for this purpose are provided with flat apertured inner ends 18 each twisted into a right angled plane relative to the plane of the finger, the bolt 15 extending through the ends 18 and being provided with a nut 19 for tightening to clamp the ends 18 against the edges of said member 4.

As shown in Figures 1 and 2, when the described holder is attached to the handle 1 at the proper distance from the pan 2, the handle 20 of a spoon may be placed on the finger 17 nearest the pan 2 and under the other finger 16, with the bowl 21 disposed over the pan and overbalancing the spoon so that it will maintain the position described.

The jaws 6 may be clampingly engaged with the handle 1 by pressing the opposite ends of the members 4, 5 together in opposition to the spring 10 to thereby separate said jaws sufficiently to straddle the handle 1, and then, by releasing the pressure on said ends of the members 4, 5 to permit said spring to urge the jaws into clamping relation to said handle 1, in a manner which will be manifest.

The foregoing will, it is believed, suffice to embody a clear understanding of my invention without further explanation.

Manifestly the invention, as described, is susceptible of modifications without departing from the inventive concept and right is herein reserved to such modifications as fall within the scope of the appended claim.

Having described the invention, what is claimed as new is:

A holder for spoons and for attachment to the handle of a pan comprising a pair of elongated flat metal clamping members, opposed side by side and connected together in spaced apart relation intermediate the ends thereof for relative swinging to clamp said handle between corresponding ends of the same, spring means interposed between portions of the members intermediate the ends of the same and urging the first-mentioned ends toward each other into clamping relation, and a pair of spoon holding flat fingers extending from opposite side edges of one member laterally of the member at right angles thereto, said spring means including a spring anchoring bolt, and said fingers having twisted flat inner ends clamped against said side edges of said one member by said bolt.

ROY D. SWIFT, JR.